United States Patent [19]

Kudo et al.

[11] 4,008,360

[45] Feb. 15, 1977

[54] PROCESS FOR PRODUCING PETROLEUM RESIN

[75] Inventors: Ken-ichi Kudo; Yoshihiko Kitagawa; Hideyuki Kuribayashi, all of Niihama, Japan

[73] Assignee: Sumitomo Chemical Company, Limited, Osaka, Japan

[22] Filed: Jan. 3, 1975

[21] Appl. No.: 538,406

[30] Foreign Application Priority Data

Jan. 8, 1974 Japan .............................. 49-5753

[52] U.S. Cl. ............................. 526/237; 428/343; 526/290
[51] Int. Cl.² ....................................... C08F 240/00
[58] Field of Search ............. 260/82; 526/237, 290

[56] References Cited

UNITED STATES PATENTS

| | | |
|---|---|---|
| 3,554,940 | 1/1971 | Arakawa et al. .................. 260/82 |
| 3,661,870 | 5/1972 | Bullard ............................... 260/82 |
| 3,692,756 | 9/1972 | St. Cyr .............................. 260/82 |
| 3,763,125 | 10/1973 | Moody et al. ....................... 260/82 |

*Primary Examiner*—Harry Wong, Jr.
*Attorney, Agent, or Firm*—Stevens, Davis, Miller & Mosher

[57] ABSTRACT

A process for producing a petroleum resin which comprises polymerizing in the presence of a Friedel-Crafts catalyst a $C_5$-fraction from cracked naphtha or oil gas, which has been subjected to an adjustment of a weight ratio of acyclic diolefins to monoolefins and a weight ratio of cyclic diolefins to monoolefins to from 0.40 to 0.70 and from 0.07 to 0.35, respectively.

10 Claims, No Drawings

PROCESS FOR PRODUCING PETROLEUM RESIN

This invention relates to a process for producing a petroleum resin having excellent performance characteristics particularly for use in an adhesive tape. More particularly, it relates to a process for producing a petroleum resin by polymerizing in the presence of a Friedel-Crafts catalyst a $C_5$-fraction obtained from a cracked naphtha or a gas oil, which has been adjusted to a weight ratio of acyclic diolefins to monoolefins of 0.40 to 0.70 and a weight ratio of cyclic diolefins to monoolefins of 0.07 to 0.35.

Regarding the production of an aliphatic petroleum resin generally based on chiefly $C_5$-hydrocarbons, there has heretofore been known a process which comprises polymerizing said $C_5$-hydrocarbons in the presence of a Friedel-Crafts catalyst at a temperature in the range from $-20°$ to $100°$ C. under atmospheric or superatompsheric pressure and, after removal of the catalyst, removing the unreacted fraction and by-produced low molecular weight substances by a treatment such as distillation.

Although depending upon the type of naphtha used as raw material and the cracking conditions, the $C_5$-fraction generally contain the following hydrocarbons: isoprene, cis- and trans-piperylene, cyclopentadiene (hereinafter referred to as CPD), dicyclopentadiene (hereinafter referred to as DCPD), 1-pentene, trans-2-butene, 2-methyl-2-butene, 3-methyl-1-butene, 2-methyl-1-butene, cis- and trans-2-pentene, cyclopentene, cis-2-hexene, 2-methyl-2-pentene, n-, iso-, and cyclopentane, n-hexane, and benzene.

The diolefins in the $C_5$-fraction constitute an essential component which gives rise to characteristic properties of the petroleum resin, and the concentration of diolefins and that of monoolefins as well as the ratio between both concentrations affect many of the characteristic properties such as tackiness, sizing effect, etc. It is necessary, therefore, to adjust the concentration of diolefins and that of monoolefins to proper values depending on the intended use of the petroleum resin. If present in too high a concentration, diolefins tend to bring about gel formation during polymerization, resulting in deteriorated resin and even in fatal accidents due to clogged reactor pipelines, while if the concentration of diolefins is too low, the resulting resin would be unable to exhibit characteristic properties of a petroleum resin, such as tackiness, sizing effect, etc. Although it has been reported that in order to prepare a petroleum resin having favorable performance characteristics, removal of CPD from the $C_5$-fraction by thermal dimerization was studied, there has been found no literature which explicitely specified the concentrations of both diolefins and monoolefins and the ratio between both concentrations in a $C_5$-fraction which would give a petroleum resin having satisfactory characteristics for use in an adhesive tape.

An object of this invention is to provide a petroleum resin excellent in various physical properties, particularly in those necessary for the resin to be used in an adhesive tape and also favorable in workability in manufacturing same.

Another object of this invention is to provide a process for producing the said petroleum resin.

Other objects and advantages of this invention will become apparent from the following description.

The present inventors engaged in extensive investigations on the process for producing a $C_5$-fraction-based petroleum resin and as a result have accomplished the present invention. This invention is a process for producing a petroleum resin excellent in adhesion characteristics by polymerizing in the presence of a Friedel-Crafts catalyst a $C_5$-fraction which was obtained from cracked naphtha or gas oil, which has been adjusted in a suitable way to the weight ratio of acyclic diolefins to monoolefins of 0.4 to 0.70, preferably 0.5 to 0.70 and the weight ratio of cyclic diolefins to monoolefins of 0.07 to 0.35, preferably 0.10 to 0.35. The acyclic diolefins as herein referred to are those represented by isoprene and cis- and trans-piperylene, both of which are main components of the $C_5$-fraction; the cyclic diolefins as herein referred to are those represented by CPD, DCPD and codimer of CPD and said acyclic diolefin or a mixture thereof and the monoolefins as herein referred to are those represented by isobutylene, 1-butene, cis- and trans-2-butene, 2-methyl-2-butene, 3-methyl-1-butene, 2-methyl-1-butene, 1-pentene, cis- and trans-2-pentene, and cyclopentene which are main components of the monoolefins in the $C_5$-fraction. The above-said adjustment of weight ratio between the diolefins and monoolefins can be effected by any of the customary procedures without any particular restriction, such as, for example, removal of isoprene by precise fractional distillation; adjustment of the concentration of diolefins and monoolefins by extractive distillation or azeotropic distillation; removal of diolefins by thermal dimerization; and addition of a $C_4$- and/or $C_5$-fraction which has been deprived of diolefins (i.e. so-called spent $C_4$- and/or $C_5$-fraction) to the $C_5$-fraction to be adjusted.

According to the present process, there is obtained a resin having desirable softening point, molecular weight, color, compatibility, and such physical properties for an adhesive tape resin as holding power, adhesion strength, and rolling-ball tack.

If a starting material of a composition not conforming to the present invention is used, the resulting resin has inferior properties as a tackifying resin. In other words, if the weight ratio of acyclic diolefins to monoolefins exceeds 0.70, the rolling-ball tack and the adhesion strength among important properties for an adhesive tape becomes inferior, while if said ratio is below 0.40, the holding power becomes undesirably decreased.

On the other hand, if the weight ratio of cyclic diolefins to monoolefins exceeds 0.35, the resulting resin becomes high in softening point and lower in rolling-ball tack and in adhesion strength, while if the ratio is below 0.07, the resin becomes lower in softening point and in holding power.

In carrying out the process of this invention, the composition of a $C_5$-fraction is adjusted so that the weight ratio of acyclic diolefins to monoolefins becomes 0.40 to 0.70 and the weight ratio of cyclic diolefins to monoolefins becomes 0.07 to 0.35, and thereafter the resulting starting material is subjected to polymerization for producing a petroleum resin in a batch-wise or continuous manner in the presence of a Friedel-Crafts catalyst such as an aluminum chloride complex, termination with methanol, washing with an alkali followed by water, and removal of the unreacted fraction and by-produced low molecular weight substances by distillation.

The Friedel-Crafts catalysts to be used in the polymerization of the present process are metallic halides such as aluminum chloride, boron trifluoride, and aluminum bromide; binary complexes of these halides with aromatic compounds; and ternary complexes of the halides, aromatic compounds, and hydrogen halides. The aromatic compounds to be used are benzene and mono-, di-, and poly-alkylbenzenes such as toluene, xylene, cymene, and cumene. Examples of hydrogen halides to be used in complexing are hydrogen chloride, hydrogen bromide, hydrochloric acid, and hydrobromic acid.

The polymerization temperature is generally in the range from 0° to 80° C. The amount of metallic halide in the catalyst to be used is in the range from 1.0 to 3.0 % by weight based on the $C_5$-fraction. The polymerization pressure is selected optionally from ordinary pressure and superatmospheric pressures. The polymerization time is not critical and is generally 10 minutes to 8 hours. Solvents may be used or not. If necessary, an aliphatic and/or aromatic hydrocarbon and/or a halohydrocarbon are used, for example, heptane, hexane, benzene, xylene, toluene, and chloro-benzene.

The invention is illustrated below in further detail with reference to Examples, but the invention is not limited to the Examples.

In Examples and Comparative Examples, tests for characteristic properties of an adhesive tape were conducted in the following ways.

The holding power was tested according to the method of JIS Z 1524-1965 and the displacement (in mm) of the tape after 2 hours under a load of 1 kg was measured.

The adhesion strength was tested according to the method of JIS C 2107-1962. The rolling-ball tack was measured by use of a Dow-type tackmeter (there are 32 gradings from 1/32 inch to 1 inch).

EXAMPLE 1

A $C_5$-fraction derived from cracked naphtha was subjected to a thermal dimerization treatment to obtain a starting material, in which the weight ratio of acyclic diolefins to monoolefins was 0.551 and the weight ratio of cyclic diolefins to monoolefins was 0.246. By use of a 2-liter autoclave equipped with a stirrer, the starting material was polymerized continuously with an aluminum chloride-hydrogen chloride-xylene complex used as catalyst (concentration of aluminum chloride: 1.2 % by weight based on starting material) at 35° C. and a retention time of 120 minutes. The resulting polymerization mixture was admixed with methanol to terminate the polymerization, washed with an alkali followed by water, and concentrated at 230° C. under reduced pressure to obtain a resin having a softening point of 100° C. and a molecular weight of 1,350.

A polyester film tape was coated with an adhesive composition comprising 50 parts by weight of the above resin and 50 parts by weight of a natural rubber having a Mooney viscosity of 25. Physical properties of the adhesive tape thus obtained were favorable as shown in Table 1.

EXAMPLE 2

A spent $C_5$-fraction was added to a $C_5$-fraction derived from cracked naphtha to adjust the weight ratio of acyclic diolefins to monoolefins to 0.605 and the weight ratio of cyclic diolefins to monoolefins to 0.197. The resulting starting material was polymerized and after-treated in the same manner as in Example 1, except that the concentration, of aluminum chloride in the catalyst was 2.0 % by weight and the polymerization temperature was 50° C. The polymerization mixture was treated in the same manner as in Example 1 to obtain a resin having a softening point of 100° C., a molecular weight of 1,200, and favorable properties as shown in Table 1.

EXAMPLE 3

A spent $C_5$-fraction was added to a gas oil-based $C_5$-fraction, which had been thermally treated, to adjust the weight ratio of acyclic diolefins to monoolefins to 0.630 and the weight ratio of cyclic diolefins to monoolefins to 0.276. The starting material thus obtained was treated in the same manner as in Example 2 to obtain a resin having a softening point of 100° C and a molecular weight of 1150. The resin had favorable properties as shown in Table 1.

EXAMPLE 4

A $C_5$-fraction obtained from cracked naphtha was subjected to a thermal dimerization treatment to adjust the weight ratio of acyclic diolefins to monoolefins to 0.519 and the weight ratio of cyclic diolefins to monoolefins to 0.255. The starting material thus obtained was polymerized and after-treated in the same manner as in Example 1, except that the polymerization temperature was 30° C., to obtain a resin having a softening point of 100° C., a molecular weight of 1,340, and favorable properties as shown in Table 1.

COMPARATIVE EXAMPLE 1

A $C_5$-fraction derived from cracked naphtha was subjected to a thermal dimerization treatment to obtain a starting material, in which the weight ratio of acyclic diolefins to monoolefins was 0.729 and the weight ratio of cyclic diolefins to monoolefins was 0.196. The starting material was polymerized and after-treated in the same manner as in Example 1, except that the polymerization temperature was 40° C., to obtain a resin having a softening point of 100° C. and a molecular weight of 1,330. An adhesive tape prepared by use of the above resin was favorable in holding power, but inferior in rolling-ball tack and adhesion strength, as shown in Table 2.

COMPARATIVE EXAMPLE 2

A $C_5$-fraction derived from cracked naphtha was subjected to a thermal dimerization treatment to obtain a starting material, in which the weight ratio of acyclic diolefins to monoolefins was 0.613 and the weight ratio of cyclic diolefins to monoolefins was 0.544. The starting material was polymerized and after-treated in the same manner as in Example 2, except that the polymerization temperature was 40° C., to obtain a resin having a softening point of 100° C. and a molecular weight of 1,200. An adhesive tape prepared by use of this resin was inferior in properties, similarly to the case of Comparative Example 1.

COMPARATIVE EXAMPLE 3

A $C_5$-fraction derived from cracked naphtha was subjected to a thermal dimerization treatment and thereafter further admixed with a spent $C_5$-fraction to obtain a starting material, in which the weight ratio of acyclic diolefins to monoolefins was 0.519 and the weight ratio of cyclic diolefins to monoolefins was 0.054. The starting material was polymerized and after-treated in the same manner as in Example 2, except that the polymerization temperature was 35° C., to obtain a resin having a softening point of 80° C. and a molecular weight of 950. As shown in Table 2, an adhesive tape prepared by use of this resin was inferior in holding power.

Table 1

| Example No. | 1 | 2 | 3 | 4 |
|---|---|---|---|---|
| Ratio between acyclic diolefins and monoolefins | 0.551 | 0.605 | 0.630 | 0.519 |
| Ratio between cyclic diolefins and monoolefins | 0.246 | 0.197 | 0.276 | 0.255 |
| Polymerization conditions: | | | | |
| Catalyst concentration, % by weight | 1.2 | 2.0 | 2.0 | 1.2 |
| Polymerization temperature, ° C. | 35 | 50 | 50 | 30 |
| Average retention time, hour | 2 | 2 | 2 | 2 |
| Properties of resin: | | | | |
| Softening point, ° C. (ring and ball method) | 100 | 100 | 100 | 100 |
| Molecular weight (VPO method) | 1,350 | 1,200 | 1,150 | 1,340 |
| Properties of adhesive tape: | | | | |
| Rolling-ball tack, ball No. (Dow-type tackmeter) | 6 | 8 | 6 | 5 |
| Adhesion strength, g/25 mm | 560 | 860 | 630 | 510 |
| Holding power, mm | 1.2 | 2.7 | 1.8 | 1.7 |

Table 2

| Comparative Example No. | 1 | 2 | 3 |
|---|---|---|---|
| Ratio between acyclic diolefins and monoolefins | 0.729 | 0.613 | 0.519 |
| Ratio between cyclic diolefins and monoolefins | 0.196 | 0.544 | 0.054 |
| Polymerization conditions: | | | |
| Catalyst concentration, % by weight | 1.2 | 2.0 | 2.0 |
| Polymerization temperature, ° C. | 40 | 40 | 35 |
| Average retention time, hour | 2 | 2 | 2 |
| Properties of resin: | | | |
| Softening temperature, ° C. (ring and ball method) | 100 | 100 | 80 |
| Molecular weight (VPO method) | 1,330 | 1,200 | 950 |
| Properties of adhesive tape: | | | |
| Rolling-ball tack, ball No. (Dow-type tackmeter) | 2 | 2 | 8 |
| Adhesion strength, g/25 mm | 270 | 310 | 750 |
| Holding power, mm | 2.0 | 1.2 | >25 |

What is claimed is:

1. A process for producing a petroleum resin having a molecular weight, softening point, holding power, adhesion strength and rolling-ball tack suitable for use as an adhesive tape resin which comprises polymerizing in the presence of a Friedel-Crafts catalyst a $C_5$-fraction from cracked naphtha or oil gas, having a composition consisting essentially of acyclic diolefins, cyclic diolefins and monoolefins wherein the weight ratio of acyclic diolefins to monoolefins and the weight ratio of cyclic diolefins to monoolefins are from 0.40 to 0.70 and from 0.07 to 0.35, respectively.

2. A process for producing a petroleum resin according to claim 1, wherein the weight ratio of acyclic diolefins to monoolefins is from 0.50 to 0.70 and the weight ratio of cyclic diolefins to monoolefins is from 0.1 to 0.35.

3. A process for producing a petroleum resin according to claim 1, wherein said weight ratios are obtained by removal of isoprene by precise fractional distillation, extractive distillation or azeotropic distillation of diolefins and monoolefins, removal of diolefins by thermal dimerization or addition of a spent $C_4$- and or $C_5$-fraction.

4. A process for producing a petroleum resin according to claim 1, wherein the acyclic diolefin is isoprene, cis- or trans-piperylene, or a mixture of 2 or more of these.

5. A process for producing a petroleum resin according to claim 1, wherein the cyclic diolefin is cyclopentadiene, dicyclopentadiene codimer of cyclopentadiene and the acyclic diolefin or a mixture of these.

6. A process for producing a petroleum resin according to claim 1, wherein the monoolefin is isobutylene, 1-butene, cis- and trans-2-butene, 2-methyl-2-butene, 3-methyl-1-butene, 2-methyl-1-butene, 1-pentene, cis-2-pentene, trans-2-pentene, cyclopentene, or a mixture of 2 or more of these.

7. A process for producing a petroleum resin according to claim 1, wherein the Friedel-Crafts catalyst is aluminum chloride, boron trifluoride, aluminum bromide, a binary complex of one of these halides with an aromatic compound, or a ternary complex involving one of the named halides, an aromatic compound, and a hydrogen halide.

8. A process for producing a petroleum resin according to claim 7, wherein the aromatic compound is benzene, toluene, xylene, cymene or cumene.

9. A process for producing a petroleum resin according to claim 7, wherein the hydrogen halide is hydrogen chloride, hydrogen bromide, hydrochloric acid, or hydrobromic acid.

10. A petroleum resin obtained by the process according to claim 1.

* * * * *